United States Patent [19]
Wilbanks

[11] Patent Number: 6,050,025
[45] Date of Patent: *Apr. 18, 2000

[54] INFRARED INSECT/MOSQUITO KILLING SYSTEM

[76] Inventor: Alvin D. Wilbanks, 3519 W. County Rd. #668, Osceola, Ark. 72370

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,282

[22] Filed: Dec. 6, 1996

Related U.S. Application Data

[63] Continuation-in-part of application No. 08/395,910, Feb. 28, 1995, Pat. No. 5,595,018.

[51] Int. Cl.[7] .................................................. A01M 1/22
[52] U.S. Cl. ............................................. 43/112; 43/139
[58] Field of Search ........................... 43/112, 113, 139

[56] References Cited

U.S. PATENT DOCUMENTS

| | | | |
|---|---|---|---|
| 1,337,560 | 4/1920 | Kohn | 43/139 |
| 1,583,975 | 5/1926 | Hunt | 43/139 |
| 1,807,076 | 5/1931 | Sweet | 43/139 |
| 2,013,969 | 9/1935 | Menasche | 43/139 |
| 2,567,616 | 9/1951 | Moore | 43/112 |
| 3,041,773 | 7/1962 | Gagliano | 43/139 |
| 3,058,257 | 10/1962 | Brophy | 43/139 |
| 3,123,933 | 3/1964 | Roche | 43/139 |
| 3,196,577 | 7/1965 | Plunkett | 43/139 |
| 3,201,893 | 8/1965 | Gesmar | 43/139 |
| 3,319,374 | 5/1967 | Gawne | 43/139 |
| 3,796,001 | 3/1974 | Jackson | 43/139 |
| 4,127,961 | 12/1978 | Phillips | 43/139 |
| 4,852,296 | 8/1989 | Swanson | 43/112 |
| 4,908,978 | 3/1990 | Zacharias | 43/112 |
| 5,241,779 | 9/1993 | Lee | 43/139 |
| 5,255,468 | 10/1993 | Cheshire | 43/112 |
| 5,301,458 | 4/1994 | Deyoreo | 43/139 |

*Primary Examiner*—Kurt Rowan
*Attorney, Agent, or Firm*—Rothwell, Figg, Ernst & Kurz

[57] ABSTRACT

An insect killing system optimized for mosquitoes uses multiple thermal gradients to simulate the breathing and body heat from animals, including human beings and fowl, to attract insects for subsequent electrocution. The system comprises an elongated, generally parallelepiped housing supported upon a lower base. A heating tower shrouded by the housing supports a spaced apart, generally pyramidal roof. Several slits penetrate the base to permit air entry. An internal fan draws air into the base where the air mixes with scent and pheromones. Mixed air is blown into and through the heating tower. An internal baffle divides the tower interior into separate, spaced apart compartments. A lower compartment houses a heater, and an adjacent upper compartment vents warmed air to atmosphere, creating numerous separate streams of warmed air that, to an insect, emulate human breathing. The baffle restricts air flow to create a pressure differential while ensuring adequate residence time to sufficiently warm the air. Heated air traversing the upper compartment is expelled through a plurality of discharge orifices. The resulting multitude of warm air currents creates an infrared signature emulating human breathing. Thermal and pressure differential gradients established by the baffle enhance the infrared illusion. Attracted mosquitoes are electrocuted by a high voltage grid. Several adjustable braces may be manually manipulated to clean the grid. A safety mesh extends between the base and the roof to prevent accidental shock.

16 Claims, 8 Drawing Sheets

INFRARED INSECT/MOSQUITO KILLING SYSTEM

CROSS REFERENCE TO RELATED APPLICATION

This is a Continuation-In-Part of my prior application bearing Ser. No. 08/395,910, filed Feb. 28, 1995, and entitled MOSQUITO KILLING SYSTEM, assigned to Group Art Unit 3205 and Examiner K. Rowan now U.S. Pat. No. 5,595,018.

BACKGROUND OF THE INVENTION

I. Field of the Invention

The present invention relates to a new and improved insect/mosquito killing system. More particularly, my invention relates to a portable insect killing system that attracts insects (preferably mosquitoes) to an electrified killing zone by emulating human, animal or fowl breathing, to simulate an infrared signature of it. Known prior art may be found in U.S. Class 43, subclasses 112, 113 and 139.

II. Description of the Prior Art

Within the recent past the use of mosquito killing devices has become well known in the prior art. Known insect or mosquito attracting and killing devices typically use light for attracting target insects. Target insects drawn towards the apparatus contact an electrocution grid for subsequent eradication. By way of example, U.S. Pat. Nos. 4,182,069, 4,523,404 and 5,301,458 as well as U.S. Pat. Nos. 5,020, 270, 3,319,374, 3,041,773, 4,454,677 and 4,852,296 all employ light for attracting insects towards an electrocution grid.

U.S. Pat. No. 5,255,468 issued to Cheshire, Jr. discloses an insect tracking and capturing apparatus having a light source to attract insects and a fan to create an air current for capturing the insects in the air current created and delivering the insects to a electrified grid for electrocution.

U.S. Pat. No. 4,951,414 issued to Mewissen discloses a device for electrocuting insects having a housing with a low pressure, mercury vapor discharge light therein. An electrically connected ballast for illuminating the mercury vapor lamp also generates voltage for electrifying the insect eradication grid.

Other interesting devices of general relevance include U.S. Pat. No. 5,205,064 issued to Nolen. It discloses a generally cylindrical device having a pressurized canister and a cam mechanism for periodically discharging the contents of the canister to attract insects for electrocution. U.S. Pat. No. 4,696,126 issued to Grothaus, et al., shows a device that uses an electric grid to temporarily shock flying insects and trap them on a sticky paper.

Some known devices employ different attractants. U.S. Pat. No. 4,891,904 issued to Tabita discloses a heating device for electrocuting mosquitoes that has a passive heating assembly disposed within an interior chamber. U.S. Pat. No. 5,241,779 issued to Lee discloses an apparatus for collecting and killing insects having a passive heat source, a sweet liquid attractant, and a killing grid for electrocuting crawling insects.

Most of the above referenced devices use complicated designs and/or structures. As a result, these prior art devices are often plagued by operational and maintenance difficulties as a result of the harsh environmental conditions in which they must operate. In particular, hungry human-biting mosquitoes commonly infest moderate and warm climates with relatively high humidities. As will be appreciated by those skilled in the art, such climates readily cultivate equipment failure because of degradation and/or deterioration.

Further, notwithstanding the myriad of designs encompassed by the crowded prior art that has been developed for the fulfillment of countless objectives, the indiscriminate attraction and subsequent eradication of diverse insects often contribute to eventual apparatus failure. Since the target insects (i.e., mosquitoes) are generally small insects with low overall body masses, conventional systems are designed to effectively disintegrate only small insects. Further, most known prior art devices constantly power the electrocution grid whenever they are operating. As a result, the power to the electrocution grid is generally restricted to minimize electricity usage to conserve operating costs.

However, the attractants (i.e., generally light emitting bulbs) used by most devices attract countless varieties of flying insects, not just mosquitoes. The attraction of larger insects (i.e., June bugs, etc.) often, at least temporarily, overloads the electrocution grid. Further, the remains of larger insects are not properly disintegrated since they are larger than the remains of smaller mosquitoes. These undisintegrated remains often clog the electrocution grid, causing short circuits and other failures. Thus, it is undesirable to attract non-target insects.

A desirable mosquito killing device should primarily attract mosquitoes and similarly sized insects to minimize maintenance and operational difficulties. A particularly ideal device would avoid attracting or injuring beneficial insects as well.

In this respect, the mosquito killing system according to the present invention substantially departs from the conventional concepts and designs of the prior art, and in doing so provides an improved apparatus for selectively exterminating target insects, namely mosquitoes. In other words, the portable system primarily attracts only mosquitoes.

SUMMARY OF THE INVENTION

My improved insect/mosquito killing system attracts mosquitoes and then electrocutes them. The system focuses on mosquito attraction by actively projecting multiple air streams with infrared heat and pressure differential gradients coupled with a wide variety of aromatics to simulate not only body heat, but the breathing of animals, including humans and fowl. The system may be effectively used either outdoors or indoors.

The system comprises an elongated, generally parallelepiped housing adapted to be disposed upon a convenient surface. The housing is secured upon a lower support base. A spaced apart, truncated pyramidal roof sits on top of the housing. An internal heating tower that is shrouded by the housing, extends between the base and the roof The tower conducts air drawn into the base up into the upper portion of the housing and then forcefully projects it outwardly. A vertically oriented electrocution grid is fixed to the outer perimeter of the tower. A safety wire mesh guard extends between the base and the roof to prevent accidental contact with the interior electrocution grid or other internal components.

The base comprises a hollow, parallelepiped casing that supports the housing. The casing has a plurality of slits disposed about its periphery through which air is suctioned. Preferably, one slit locates a moist wick that draws moisture into the casing interior where it is absorbed by the passing air currents. A scent drawer penetrating the casing periphery contains scents that simulate common human or animal smells. Scents gradually released into the casing interior mix with the air currents drawn through the tower for eventual expulsion.

An internal fan forcefully draws air through the slits and into the casing. Preferably, the fan has a relatively low volumetric output rate, on the order of fifteen cubic feet per minute (cfm). Entering air is turbulently mixed with the released scents and emitted moisture in the casing interior. Preferably, the fan is secured immediately adjacent the tower bottom so that air suctioned through the casing is blown directly into the heating tower lower compartment.

The tower preferably comprises an elongated tubular conduit with a rectangular crosssection. The external perimeter of the conduit is blanketed by an electrocution grid. A plurality of spaced apart braces secure the electrocution grid to two elongated, vertically oriented parallel rods longitudinally aligned with the longitudinal axis of opposite tower corners.

Preferably an internal baffle divides the tower into a lower and an upper section and establishes a pressure gradient. The lower section houses a central, elongated electric heater that warms air blown into the conduit by the fan. The baffle ensures that the residence time of the air in the lower section is adequate to heat the air sufficiently. The operating temperature, preferably between 100 and 120 degrees Fahrenheit, is maintained by a system thermostat. The baffle also restricts air flow to increase the pressure differential of the internal air. Several holes in the baffle permit controlled fluid flow from the lower section into the upper section.

The upper section ultimately disperses the heated and/or scented air. As the air is blown into the upper section from the bottom section, it begins cooling. A plurality of regularly spaced apart orifices penetrate the upper section. The orifices project the heated air outwardly from the tower in the form of multiple streams. Exiting air travels through the orifices into the area surrounding the housing. The multitude of air currents established thereby resembles the air currents made when breathing (i.e., exhaling). These air streams simulate the infrared signature of an animal such as a human being. Further, the infrared characteristics of the compartmentalized tower emulate the infrared body heat signature that attracts mosquitoes. In other words, the combination of the heated tower and the scented, warm air streams outputted from the tower attracts mosquitoes.

Attracted mosquitoes are electrocuted when they reach the tower by a grid mounted on the tower exterior. Several spaced apart, adjustable braces may be manually manipulated to clean the grid. An exterior guard prevents inadvertent contact with the electrocution grid.

Thus, the primary object of the present invention is to effectively destroy large numbers of mosquitoes.

Another important object is to provide an insect eradication device for mosquito control that emulates the infrared signature of an animal (i.e., fowl or a human being) to attract target insects.

Another object is to simulate the infrared appearance and scent of an animal likely to be attacked by mosquitoes. It is an important feature of my invention that warm air currents are established to emulate the breathing of an animal or human being.

Another important object of the invention is to provide a mosquito destruction device that operates without lights.

Another object or feature of my invention is to amplify the attractiveness of the device to mosquitoes through the generation of infrared images likely to be targeted by mosquitoes A related object of my invention is to avoid the use of ultraviolet light radiation.

A basic object is to provide an environmentally sound mosquito control device.

Yet another important object of my invention is to minimize the use of pesticides, chemicals, or hazardous materials while bringing about a viable mosquito control program.

Thus a related object is to effectively control mosquito populations without introducing pollutants into the environment.

A still further object is to provide a mosquito destruction device of the character described that provides a viable alternative to the hitherto common practice of chemical spraying. It is an important feature of the invention that an effective mosquito control alternative to unrestricted aerial application of insecticide can be provided by properly placing a number of my devices in appropriate spaced apart locations known to be inhabited by target mosquitoes.

Another object is to avoid destroying beneficial or non-target insects.

Another basic object of the invention is to attract mosquitoes with a device of the character described that uses thermal and pressure gradients.

More particularly, an object of my invention is to provide a mosquito attracting and destruction device that simulates animal breathing and human body heat. An important feature of my invention is that thermal gradients and a plurality of air streams generated by the apparatus present a false infrared, image of a breathing human (or animal, fowl, etc.) to target mosquitoes.

Another object is to provide a highly efficient mosquito destruction system in which mosquitoes are drawn towards the device through means other than mere fan suction.

Thus, a related object is to attract mosquitoes to be destroyed without relying upon mere suction. It is a feature of the invention that mosquitoes are naturally attracted to the instant device, and need not be drawn in through suction for annihilation.

Yet another object of the present invention is to provide a mosquito killing device that is easily serviced and maintained.

A related object is to provide a mosquito control device that is easily cleaned. It is a feature of the invention that the guard may be temporarily removed, enabling manual cleaning of the electrocution grid when necessary. However, it is a feature of the invention that the electrocution cage is self cleaning.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a frontal isometric view of a preferred embodiment of the invention;

FIG. 2 is a partially fragmented isometric view similar to FIG. 1, but with the safety guard omitted for clarity;

FIG. 3 is a greatly enlarged, partially fragmented isometric view of the upper area circled on FIG. 2, with portions omitted for clarity;

FIG. 4 is a greatly enlarged, partially fragmented isometric view of the lower area circled on FIG. 2, with portions omitted for clarity;

FIG. 7A is a greatly enlarged, partially fragmented isometric view of the circled area of FIG. 7, with portions omitted for clarity;

DETAILED DESCRIPTION

Figure 1:
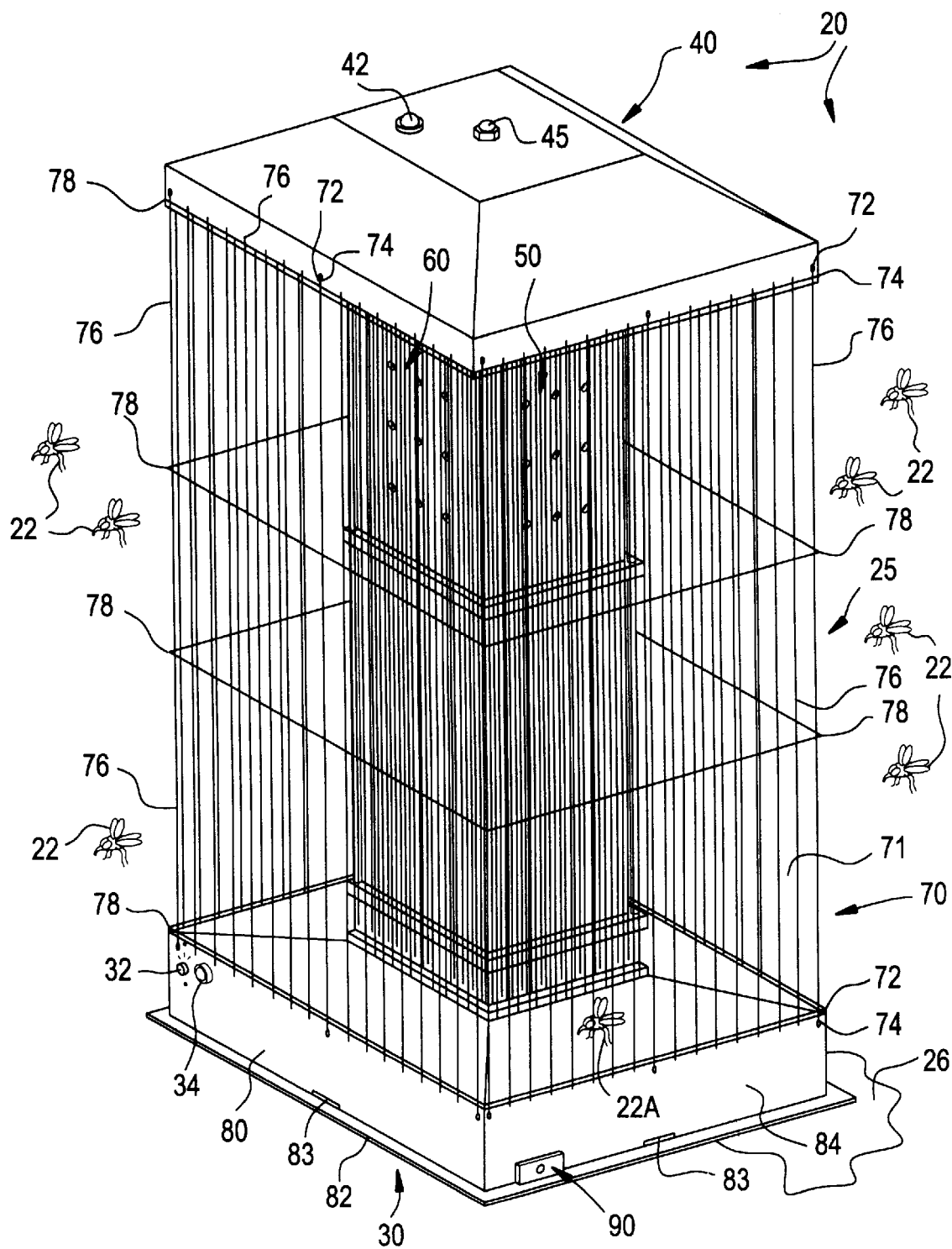

Referring more specifically to the drawings, my improved mosquito killing system is generally designated by reference numeral 20. System 20 attracts mosquitoes 22 by actively projecting multiple infrared heat gradients and pressure differentials coupled with a wide variety of aromatics that simulate animal body heat and breathing.

Figure 2:
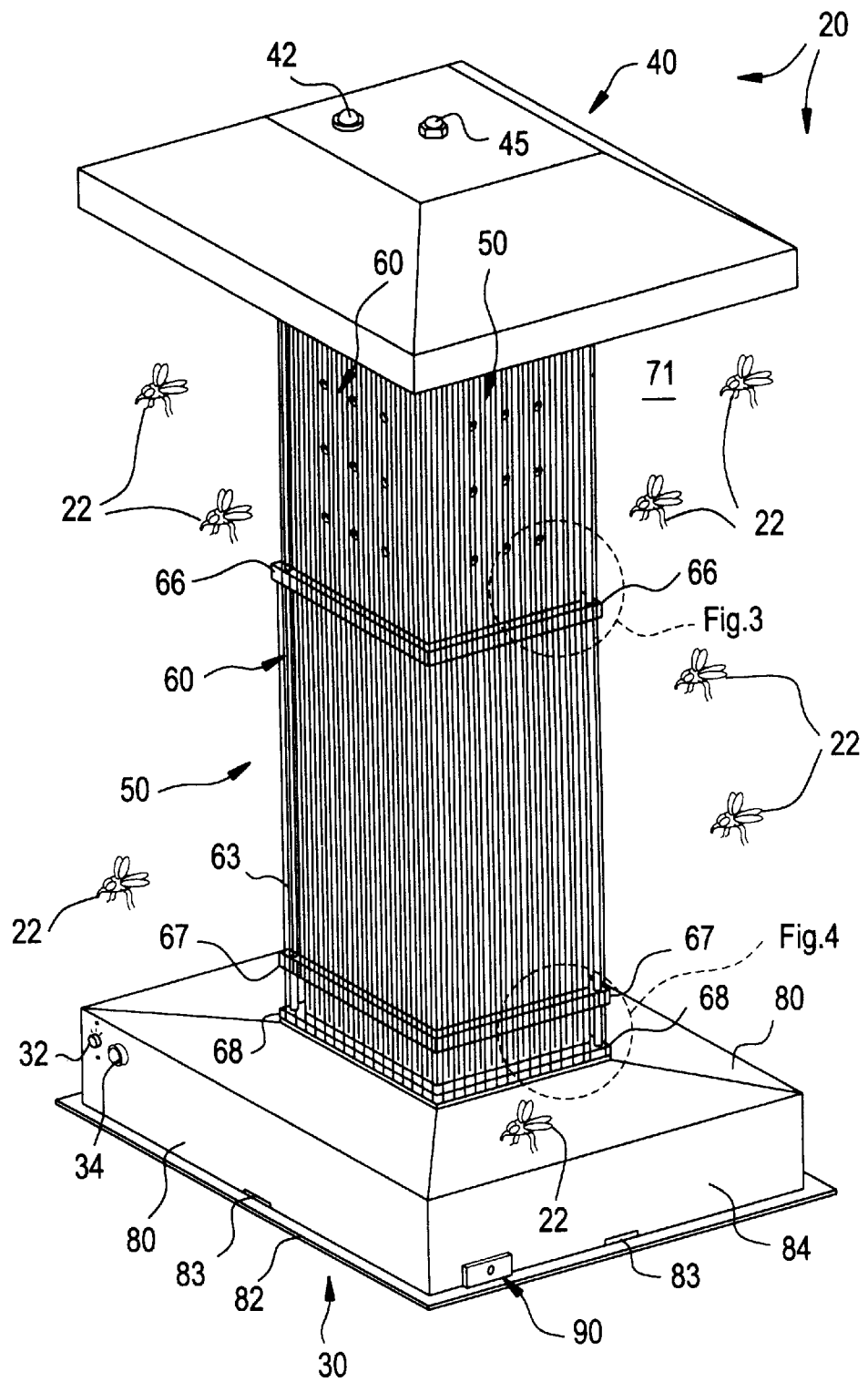

In the best mode, system 20 comprises an elongated, generally parallelepiped housing 25 disposed upon a convenient supporting surface 26 (FIG. 1). The housing comprises a rectangular support base 30 and a spaced apart, truncated pyramidal roof 40 (FIGS. 1–2). The roof closes the tower interior. A switch 32 and photoelectric sensor system 34 control system operation, as discussed hereinafter. A pilot light 42 physically protrudes from roof 40 to indicate the operational status of system 20.

The roof 40 is secured to an internal heating tower 50 extending between the base 30 and the roof 40. A conventional bolt 45 extends through roof 40 to mate with a conventional nut 40. A crossmember 48 secures roof 40 to tower 50 and base 30.

The tower 50 conducts air drawn into the base 30 into the upper portion of the housing and then forcefully projects it outwardly. A vertically oriented electrocution grid 60 is fixed to the outer perimeter of the tower 50. An outermost, safety wire mesh guard 70 surrounds the tower. It extends between the base and the roof to prevent accidental contact with the interior electrocution grid 60 or other internal components. An annular region 71 is defined between the guard 70 and tower 50; this region is traversed by mosquitoes 22, 22A (FIG. 1) passing through the guard. Several spaced apart terminal loops 72 and conventional screws 74 removably secure guard 70 to the base 30 and roof 40. The wire mesh comprises several vertically aligned, parallel, spaced apart stringers 76 reinforced by several parallel, regularly spaced apart horizontal crossmembers 78.

Figure 7:
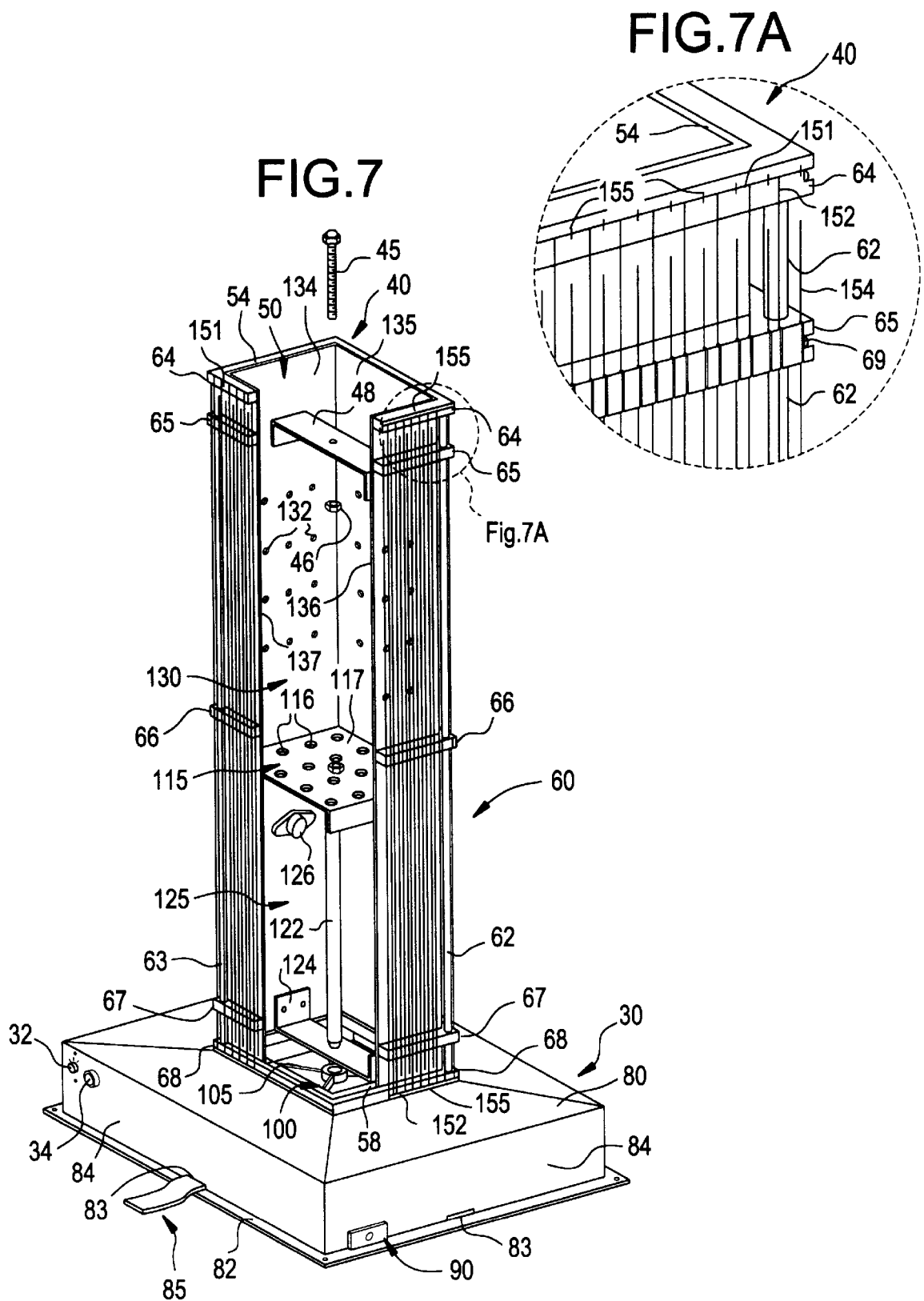
FIG. 7 is a partially fragmented isometric view similar to FIG. 2, but with portions omitted or broken away for clarity.

The base 30 preferably comprises a hollow, parallelepiped casing 80 (FIGS. 2, 7–8) that supports the housing 25. The casing 80 rests on plate 82. Casing 80 is penetrated by a plurality of intake orifices 83 for first admitting air into the system in response to fan suction. These preferably slit-shaped orifices 83 are regularly spaced about the casing periphery 84 for admitting air into the system. One slit 83 exposes a moist wick 85 to the exterior of the device. A scent drawer 90 also penetrates casing 80.

The scent drawer 90 contains gel 92 that simulates common smells attractive to mosquitoes or to the target insect. The gel 92 gradually releases pheromones (represented by dashed lines 98) into the casing interior 86 for mixture with the entering air currents (represented by dotted lines 108). Wick 85 supplies moisture (represented by dotted and dashed lines 88) to the casing interior, where it is mixed with the entering air currents 108. Casing interior 86 serves as a mixing chamber where the entering air 108 is intermixed with aromatics 98 and moisture 88.

An internal fan 100 forcefully draws air 108 through the slits 83 and into the casing 80. Preferably, the fan 100 has a relatively low volumetric output rate, in the range of ten to twenty cubic feet per minute (cfm), most preferably fifteen cfm. As air 108 is suctioned into the apparatus it is turbulently mixed with the released aromatics 98 and emitted moisture 88 in the casing interior 86. Fan 100 is secured to plate 82 adjacent transformer 102. Preferably, the fan blades 105 are positioned immediately adjacent the tower bottom 58. Air forced upwardly by the fan is directly forced into the heating tower 50 and eventually rises to top 54. The resultant tower air stream is represented generally by arrows 118 (FIG. 8).

The tower 50 preferably comprises an elongated tubular conduit 110, preferably with a rectangular cross-section. The external surface 112 of the conduit 110 is obscured by electrocution grid 60. A plurality of spaced apart braces 64, 65, 66, 67 and 68 secure the electrocution grid to two elongated, vertically oriented parallel rods 62 and 63 that are parallel to the longitudinal axis of opposite tower corners 52 and 53. Of course, tower 50 could be cylindrical or another configuration as long as vertical air flow through tower 50 remains.

Figure 8:
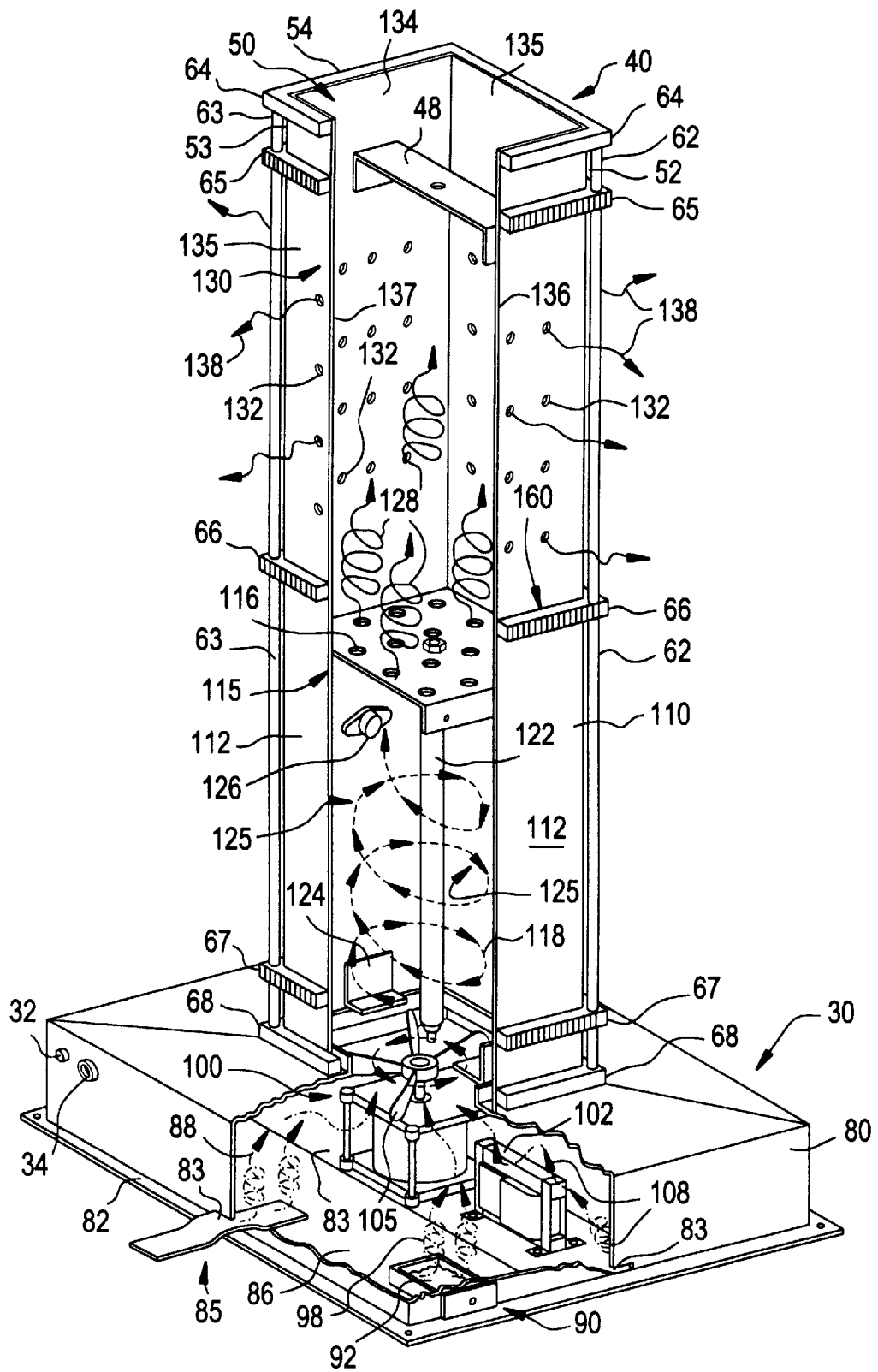
FIG. 8 is a partially fragmented isometric view similar to FIG. 7, but with portions omitted or broken away for clarity; and, FIG. 9 is a schematic diagram of the electrical circuitry.

In the best mode an internal, perforated baffle 115 divides the tower 50 into adjacent, lower and upper tubular sections 120 and 130 respectively (FIG. 8). Tower section 120 defines an enclosed heating chamber 125. The upper tower section 130 defines an adjacent dispersal chamber 135. In effect the baffle 115 comprises a restrictor plate between the chambers that affects the internal tower airflow 118. It establishes an internal pressure differential between the chambers. Because of the preferred baffle design, denser, warmer air in the lower chamber is at a higher pressure than air above. The tower air pressure differential, and the temperature and pressure gradients established with the preferred structure I have detailed are important. These synergistically enhance the ability of the system to emulate the infrared signature of a live, breathing animal that is attractive to insects. In other words, I have found that this arrangement produces infrared images that simulate the presence of breathing animals, including human beings, fowl and the like.

The lower tower section 120 houses an elongated, cylindrical, resistive electric heater 122 that warms air within the heating chamber. Baffle 115 restricts the upward air flow to ensure that the residence time of the air 118 in the lower section 120 is adequate to heat the air sufficiently (preferably to a temperature between 100 and 120 degrees Fahrenheit). Preferably, heater 122 centrally extends along the longitudinal axis of section 120 between bottom 58 and baffle 115. Heater 122 is supported at one end by a strut 124 extending across bottom 58 above fan 100. The opposite end of heater 122 is supported by brace 115.

Thus turbulent air 118 is heated as it travels past heater 122. A thermostat 126 controls the operation of heater 122 by monitoring tower temperature. Thermostat 126 is preferably mounted adjacent baffle 115 with its thermostatic element in thermal contact with the tower. Of course, the extent to which the air is heated depends upon prevalent external environmental conditions, as will be discussed more thoroughly hereinafter.

Baffle 115 increases the internal tower pressure differential. As air 118 flows up conduit 110, baffle 115 restricts its flow. Several holes 116 penetrate the plate 117 comprising baffle 115. These holes 116 permit air 118 to eventually cross into top section 130. Consequently, the pressure of the air (indicated by arrows 128) entering the upper section 130 is increased by the restriction of baffle 115. Thus, heated air 128 has both a higher temperature and a higher pressure than entering air 108.

Air 128 entering the upper section 130 is eventually dispersed into housing 25 and the immediately surrounding area. As air 128 enters the upper section 130 from the bottom section 120, it flows through a plurality of regularly spaced apart discharge orifices 132 penetrating the upper section walls 134, 135, 136 and 137 beneath the roof The discharge orifices pass heated, slightly pressured air outwardly in small turbulent streams (as indicated by arrows 138). The air streams 138 emitted from the orifices into the housing are strongest within the interior annulus 71. The multitude of air streams established thereby create the appearance of animal breathing. In addition there are thermal and pressure gradients surrounding the housing 25. These gradients additionally simulate human breathing, and the resultant thermal pattern attracts mosquitoes who mistake it for the infrared signature of an animal, including a human being, fowl or the like.

Figure 3:
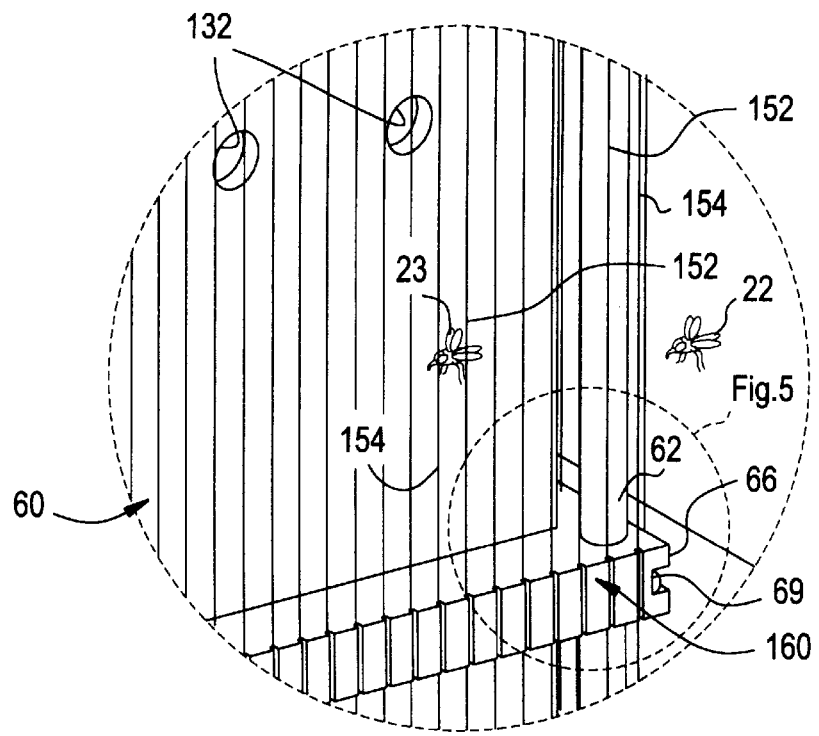
Figure 4:
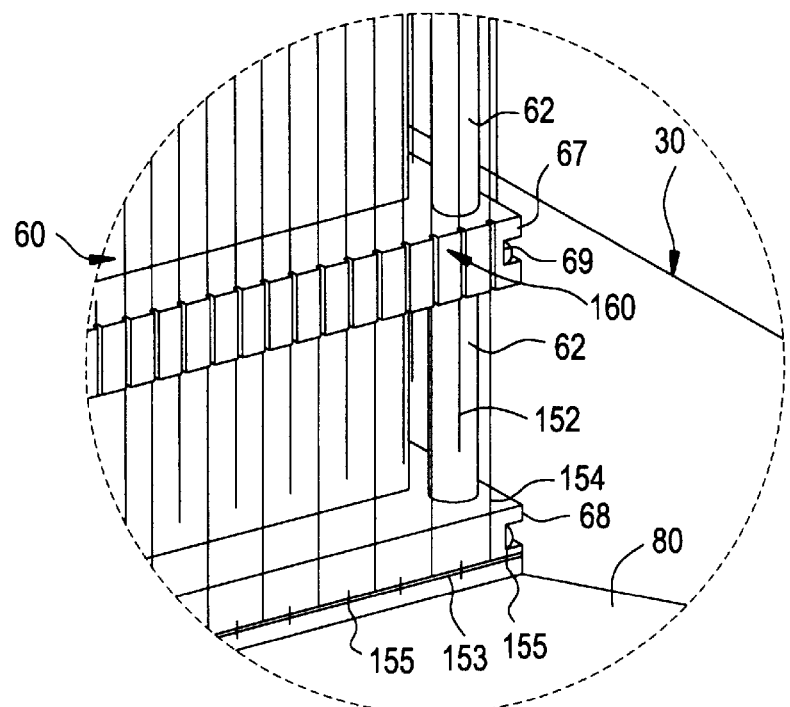
Figure 5:
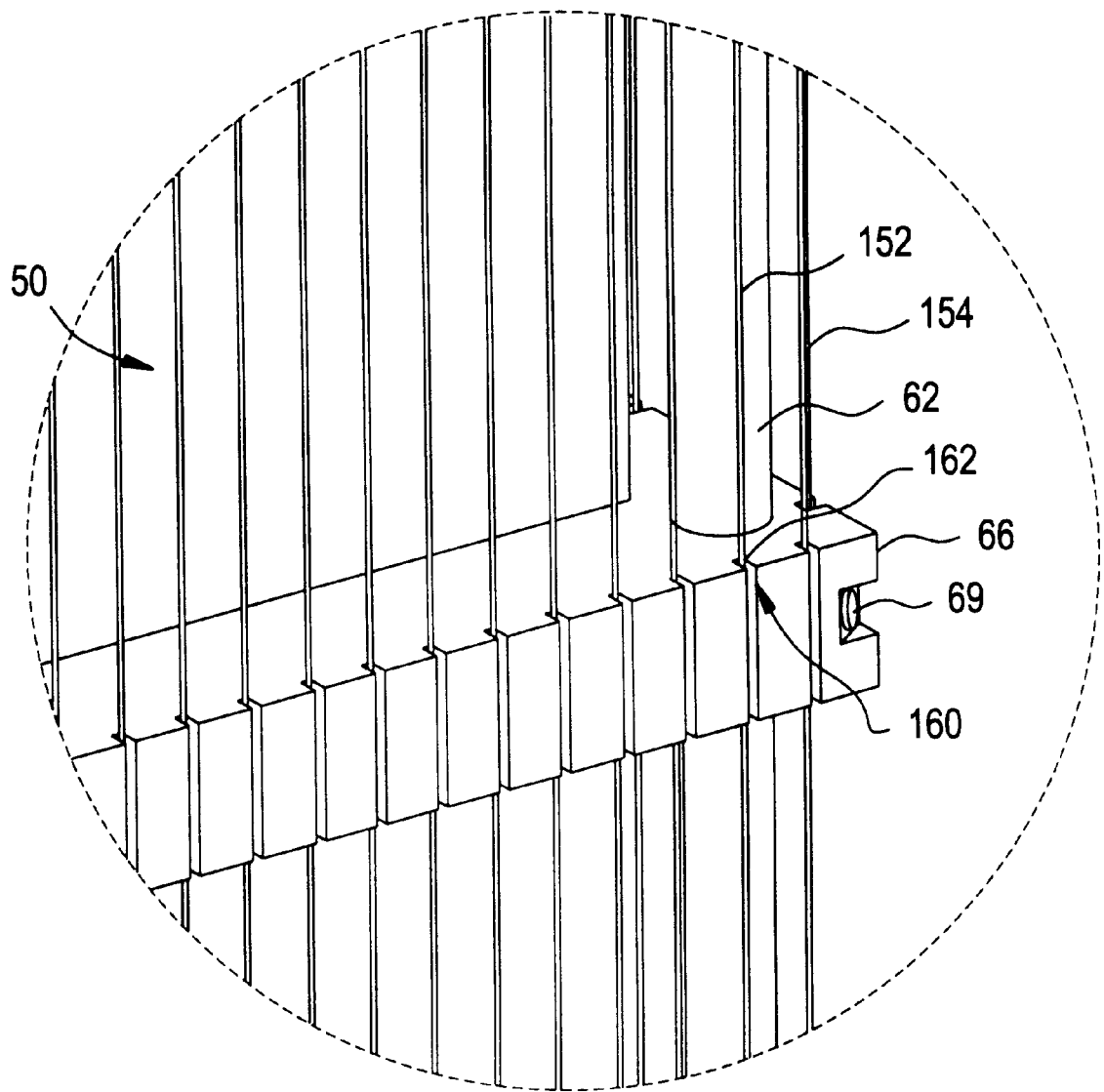
FIG. 5 is a greatly enlarged, partially fragmented isometric view of the area circled on FIG. 3, with portions omitted for clarity.

Attracted mosquitoes 22 are electrocuted (i.e., mosquito 23 shown in FIG. 3) when they approach the tower 50 by the electrocution grid 60 surrounding the exterior conduit surface 112. The electrocution grid 60 comprises a vertically oriented wire network 150. Multiple spaced apart electrically conductive stringers 152 extend downwardly from top brace 64 and main line 151 with corresponding spaced apart electrically conductive stringers 154 protruding upwardly from bottom brace 68 (FIGS. 4 and 7A). A plurality of staples 155 secure both main lines 151, 153 to respective braces 64 and 68.

The downwardly oriented and upwardly oriented stringers 152 and 154 alternate. In other words, an upward stringer 154 extends between each downward stringer 152 (FIG. 7A). Whenever an object touches a downward and an upward stringer 152 and 154, it creates a short circuit that electrifies the object, such as mosquito 23.

Figure 6:
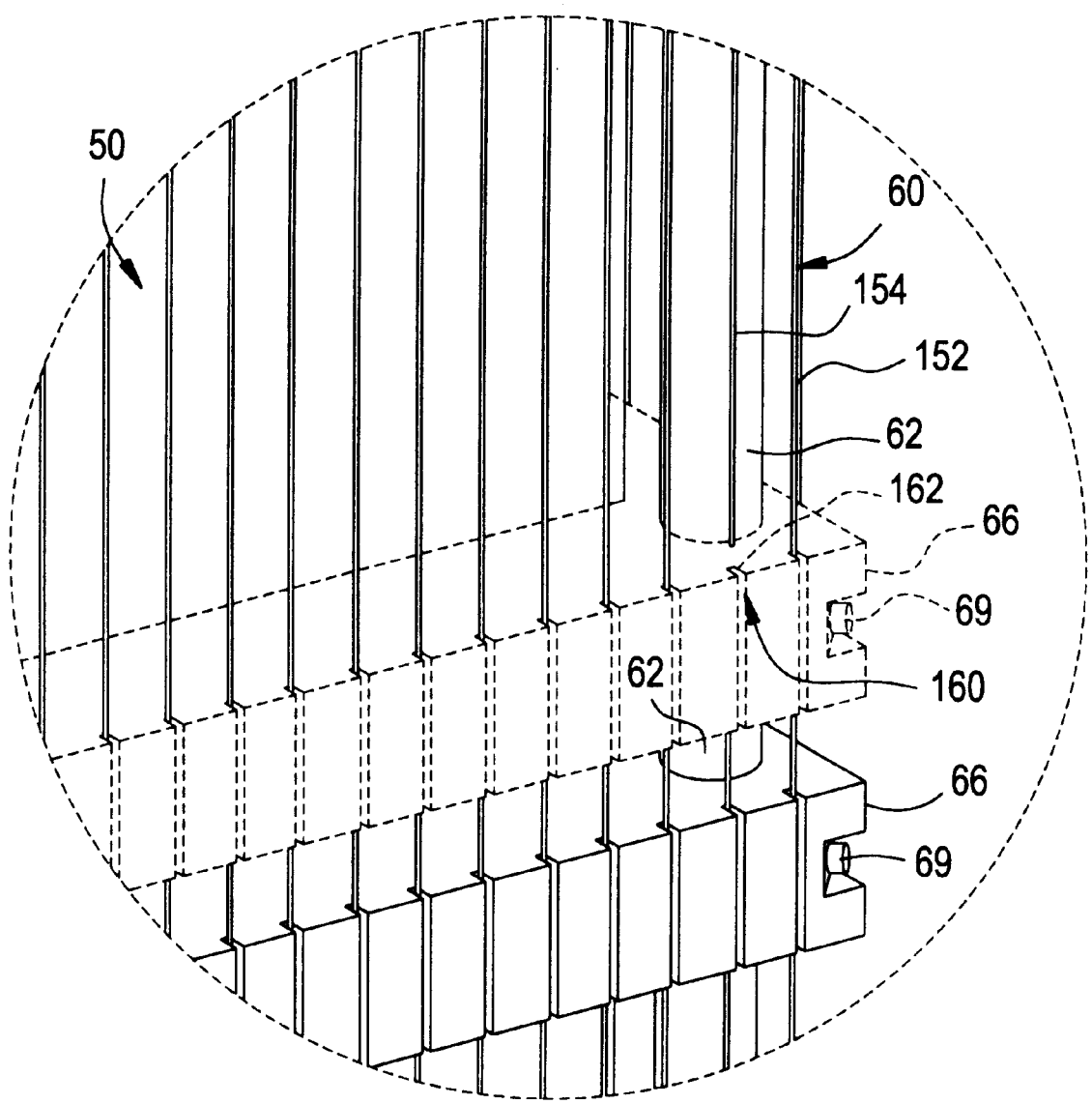
FIG. 6 is a greatly enlarged, partially fragmented isometric view similar to FIG. 5, with a moved position shown.

After electrocution, the insects (i.e., mosquitoes) are generally disintegrated. Other remains generally fall toward the base 80 where they are typically swept away by winds, etc. However, when necessary, the middle braces 65, 66 and 67 may all be manually manipulated to clean the grid 60. A set screw 69 normally retains the braces in place. Set screw 69 tightens against rod 62 or 63 to secure the brace 64–68. Set screw 69 may be loosened to move braces 65, 66 or 67 upwardly or downwardly to clean stringers 152 and 154 as shown in FIG. 6. A groove 160 extending through braces 65, 66 and 67 receives the stringers 152 and 154. The stringers 152 and 152 slide along the grooves 160 with lip 162 removing any debris thereon.

PREFERRED CONTROL CIRCUIT

Figure 9:
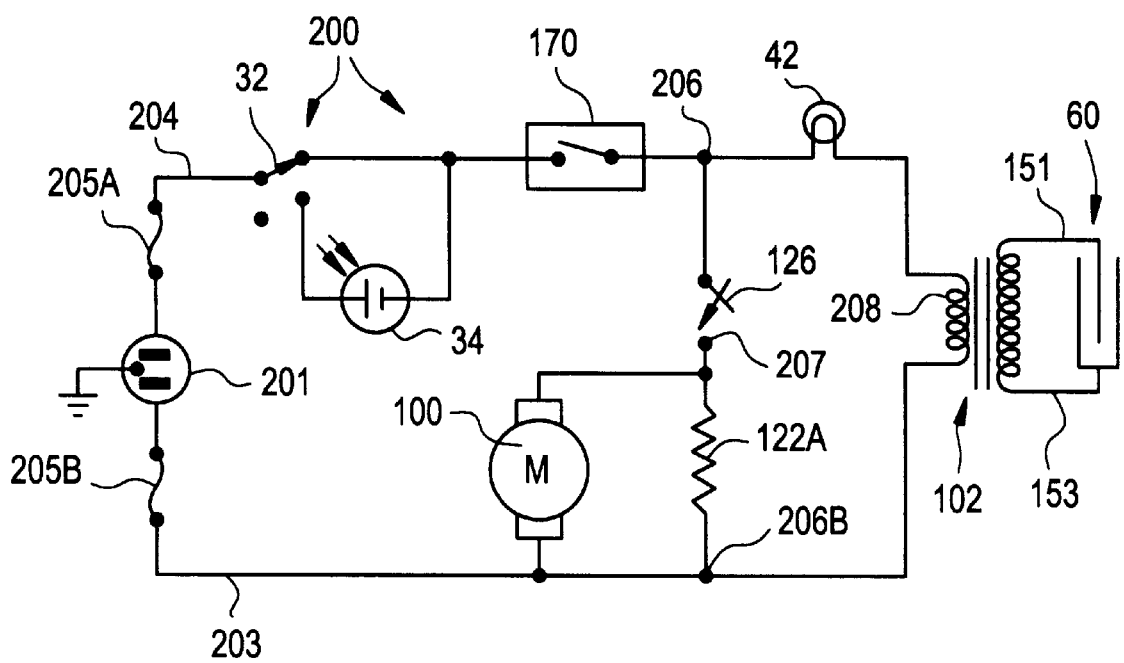

With primary emphasis now directed to FIG. 9, the preferred electrical control circuit has been designated by the reference numeral 200. Nominally 120 volt A.C. voltage is supplied to the circuitry with a standard three-prong plug 201. Voltage is transmitted across input lines 203, 204 through fuses 205A and 205B. Switch 32 may be user selected to apply power directly to tilt-over safety switch 170. Alternatively, switch 32 may direct voltage via photoelectric switch system 34 to switch 170, or it may be switched "off." System 34 automatically energizes and controls the apparatus depending upon ambient light conditions. Safety tilt-over switch 170 disables the apparatus when the tower is tipped over approximately thirty degrees from vertical.

Voltage applied to node 206 is applied to a thermostat-controlled switch 126. Switch 126 applies voltage to node 207 to energize both motor 100 and resistive heating element 122A. Voltage on node 206 also energizes the primary 208 of high-voltage transformer 102. As long as there is voltage across nodes 206, 206B the pilot light 42 will be energized as well. High voltage outputted from the transformer across lines 151 and 153 electrifies the electrocution grid 60 previously discussed.

OPERATION

For best results the device should be operated during the night. It should be placed away from humans. During daylight hours it is preferably placed in the shade. During operation system 20 attracts mosquitoes 22 by projecting air 138 outwardly from tower 50. Air 138 comprises a mixture of moisture 88, aromatics 98 and heated and pressurized air 128. The projected air 138 creates several thermal and pressure gradients around housing 25 that simulate human breathing and body heat. The aromatics 98 and moisture 88 further enhance the simulation of a live animal such as a human or fowl.

The system 20 first draws air 108 into base 30 through several slits 83 as a result of the operation of fan 100. Of course switch 32 must first be activated. As air 108 enter the casing interior 86, it mixes with aromatics 98 escaping from drawer 90 and moisture 88 from wick 80. The mixed air is then blown upwardly into heating tower 50.

As the blown air 118 enters the lower tower section 120, it passes an electric heater 122. Heater 122 warms air 118 to a preselected temperature as determined by thermostat 126. The heated air 118 is also slightly pressurized by baffle 115 as it moves into dispersal chamber 130.

Air 128 moving into chamber 130 is projected outwardly through several orifices 132. As air 128 leaves chamber 130, it begins cooling and depressurizing as it moves outwardly. Cooled and depressurized air 138 establishes multiple thermal and pressure gradients once outside tower 50. Even more thermal and pressure gradients are created once air 138 leaves housing 25.

The multiple gradients attract mosquitoes 22. As attracted mosquitoes 22 enter housing 25 through guard 70, they alight upon grid 60 where they are subsequently disintegrated (i.e., mosquito 23). Since system 20 attracts mosquitoes without ultraviolet light, beneficial insects and other insects are not attracted to system 20. In other words, since system 20 uses the infrared spectrum to attract target insects such as mosquitoes, the system 20 does not attract large numbers of non-target insects.

Experience dictates that the air 138 passing guard 70 should approximate 100 degrees Fahrenheit. In other words, on windy or cold days, the thermostat 126 should run heater 122 longer than warm, hot days.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for attracting and eradicating insects or mosquitoes, said system comprising:
    a base adapted to be disposed upon a supporting surface;
    a heating tower extending upwardly from said base, said tower comprising an interior;
    fan means for drawing air into said system and establishing an air stream through said tower interior;
    heater means for warming said air stream, wherein said heater means does not comprise a light bulb;
    means for electrocuting mosquitoes attracted to said tower, said electrocuting means extending along the extending direction of said tower; and
    a plurality of orifices for discharging warmed air streams from said interior of said tower outwardly through said electrocuting means in a direction transverse to the extending direction of said tower, for simulating the infrared signature of breathing animals, thereby attracting insects.

2. The system as defined in claim 1 further comprising a plurality of orifices defined in said base for admitting air into said system in response to fan suction.

3. The system as defined in claim 1 further comprising means for releasing preselected scents into said air stream.

4. The system as defined in claim 3 wherein said means for releasing preselected scents comprises a wick for releasing moisture into air passing by and through the wick.

5. The system as defined in claim 1 wherein said electrocution means comprises an elongated, electrically conductive wire grid surrounding said tower and means for applying high voltage to same.

6. The system as defined in claim 5 further comprising guard means surrounding said tower and extending between said base and said roof for preventing accidental contact with said grid.

7. The system as defined in claim 1 further comprising a perforated baffle disposed within said tower for restricting tower airflow.

8. The system as defined in claim 7 wherein said baffle divides the tower interior into separate, adjacent heating chambers and dispersal chambers.

9. The system as defined in claim 8 wherein said heater means for warming air is disposed within said heating chamber.

10. A method for eradicating insects such as mosquitoes, said method comprising the steps of:
    a) providing an upright hollow tower extending in a first direction with separate first and second chambers;
    b) providing an electrocution device surrounding said first and second chambers and extending along said first direction;
    c) forcing air into said tower;
    d) heating air within said first chamber;
    e) passing heated air from said first chamber at a first air pressure to said second chamber at a second air pressure lower than said first air pressure;
    f) projecting heated air outwardly from said second chamber in a direction transverse to said first direction to an area surrounding said electrocution device to attract mosquitoes or other insects to said electrocution device by simulating human or animal breathing; and
    g) electrocuting mosquitoes thereby attracted to said tower with said electrocution device.

11. The method as defined in claim 10 including the further step of drawing air into said tower through a plurality of inlet orifices defined in a supporting base in fluid flow communication with said tower.

12. The method as defined in claim 11 including the further step of adding scents or pheromones to air suctioned into said system.

13. The method as defined in claim 10 including the step of defining said chambers with a perforated baffle plate to thereby establish an air pressure differential between said chambers that enhances air output.

14. A system for attracting and eradicating insects or mosquitoes, said system comprising:
    a base adapted to be disposed upon a supporting surface;
    a heating tower extending upwardly from said base, said tower comprising an interior;
    fan means for drawing air into said system and establishing an air stream through said tower interior;
    heater means for warming said air stream;
    a first plurality of separate, vertically spaced orifices for discharging warmed air streams from said tower in a direction transverse to the extending direction of said tower for simulating the infrared signature of breathing animals, thereby attracting insects; and
    means for electrocuting mosquitoes attracted to said tower.

15. The system as defined in claim 14, further comprising a second plurality of separate, vertically spaced orifices for discharging warmed air streams spaced horizontally from said first plurality of separate, vertically spaced orifices.

16. A system for attracting and eradicating insects or mosquitoes, said system comprising:
    a base adapted to be disposed upon a supporting surface;
    a heating tower extending upwardly from said base, said tower comprising an interior;
    fan means for drawing air into said system and establishing an air stream through said tower interior;
    heater means for warming said air stream;
    a plurality of orifices for discharging warmed air streams from said tower for simulating the infrared signature of breathing animals, thereby attracting insects; and
    means for electrocuting mosquitoes attracted to said tower, wherein said electrocuting means is disposed to surround said plurality of orifices, such that said warmed air streams are projected from said orifices through said electrocuting means in a direction transverse to the extending direction of said tower.

* * * * *